(12) United States Patent
Wadia et al.

(10) Patent No.: US 7,346,064 B2
(45) Date of Patent: Mar. 18, 2008

(54) ROUTING PACKETS IN PACKET-BASED INPUT/OUTPUT COMMUNICATIONS

(75) Inventors: Percy K. Wadia, Sunnyvale, CA (US); Ronald L. Dammann, Palo Alto, CA (US); James A. McConnell, Longmont, CO (US)

(73) Assignee: Intel Corporation, Santa Clara, CA (US)

( * ) Notice: Subject to any disclaimer, the term of this patent is extended or adjusted under 35 U.S.C. 154(b) by 1097 days.

(21) Appl. No.: 10/255,419

(22) Filed: Sep. 26, 2002

(65) Prior Publication Data
US 2004/0062242 A1 Apr. 1, 2004

(51) Int. Cl.
*H04L 12/28* (2006.01)
*H04L 12/56* (2006.01)
*H04J 1/16* (2006.01)
*H04J 3/14* (2006.01)
*G06F 11/00* (2006.01)
*G08C 15/00* (2006.01)

(52) U.S. Cl. ...................................... 370/401; 370/229
(58) Field of Classification Search ................ 370/401, 370/419, 229, 235, 252, 475, 385–395, 412; 709/238, 250, 225, 228, 237, 203, 246, 233; 455/3.06, 518, 519; 710/316, 305; 713/150
See application file for complete search history.

(56) References Cited

U.S. PATENT DOCUMENTS

| 6,839,794 | B1 * | 1/2005 | Schober ...................... 710/316 |
| 6,950,394 | B1 * | 9/2005 | Chou et al. .................. 370/229 |
| 7,010,607 | B1 * | 3/2006 | Bunton ........................ 709/228 |
| 7,111,101 | B1 * | 9/2006 | Bourke et al. .............. 710/305 |
| 2002/0143981 | A1 * | 10/2002 | DeLima et al. ............. 709/233 |
| 2003/0200315 | A1 * | 10/2003 | Goldenberg et al. ........ 709/225 |
| 2004/0013088 | A1 * | 1/2004 | Gregg ......................... 370/235 |
| 2004/0024903 | A1 * | 2/2004 | Costatino et al. ........... 709/238 |

OTHER PUBLICATIONS

Intel® InfiniBand* Architecture "Solution for Developers and IT Managers" Brochure, 2002.

* cited by examiner

*Primary Examiner*—Wing Chan
*Assistant Examiner*—Prenell Jones
(74) *Attorney, Agent, or Firm*—Trop, Pruner & Hu, P.C.

(57) ABSTRACT

An interconnect device (e.g., a switch) includes a port operably coupled to a packet broadcaster for routing unicast and/or multicast packets of data in packet-based input/output communications. For an inbound packet, at least two combinations of a source port and one or more destination ports, and one or more destination paths associated with each of said one or more destination ports may be determined by the packet broadcaster in a single lookup of a memory (e.g., a random access memory).

28 Claims, 5 Drawing Sheets

ROUTING PACKETS IN PACKET-BASED INPUT/OUTPUT COMMUNICATIONS

BACKGROUND

This invention relates generally to data communications over interconnect infrastructure, and particularly to routing packets in packet-based input/output data communications.

Using a host of interconnect technologies, different forms of data may be typically routed between a variety of data computers or servers in application processing and enterprise computing environments. As an example, in a packet-based input/output communication a data packet, such as a unicast and/or a multicast packet may be received at an interconnect device including a switch or a router. While the unicast packet is forwarded to a predefined destination port, the multicast packet is transmitted to more than one destination ports. Although each transfer of a multicast packet may be treated as a unicast transfer, however, satisfying all the multicast requirements may be extremely inefficient and time consuming because of the number of iterations required to transfer the multicast packet to multiple destination ports on a one-to-one transfer basis. Also at a switch (or any other interconnect device), the multicast packet may remain in an input buffer for a long time, creating a backlog of pending packets thereafter.

Regardless of the packet type, another significant bottleneck for routing a packet through an interconnect device is mapping of addresses. While routing a packet, typically some form of address mapping occurs in a central unit, which is accessed by all the ports on the switch. Since a single unit does the entire mapping for each port, it is a serial process, creating a significant bottleneck and slow down in the switch, even though the ports may have the required bandwidth to transfer the packet. For mapping, an address translation process commonly involves two stages. Upon receipt of a packet, while one stage provides mapping to a specific destination port, the other stage involves mapping to provide one or more destination paths associated with one or more destination ports on which the packet is routed. Because the second stage needs the destination port, it must sequentially follow the first stage, resulting in increased latency.

Thus, there is a continuing need for better ways to route packets in packet-based input/output data communications, especially in a switch.

DETAILED DESCRIPTION

Figure 1:
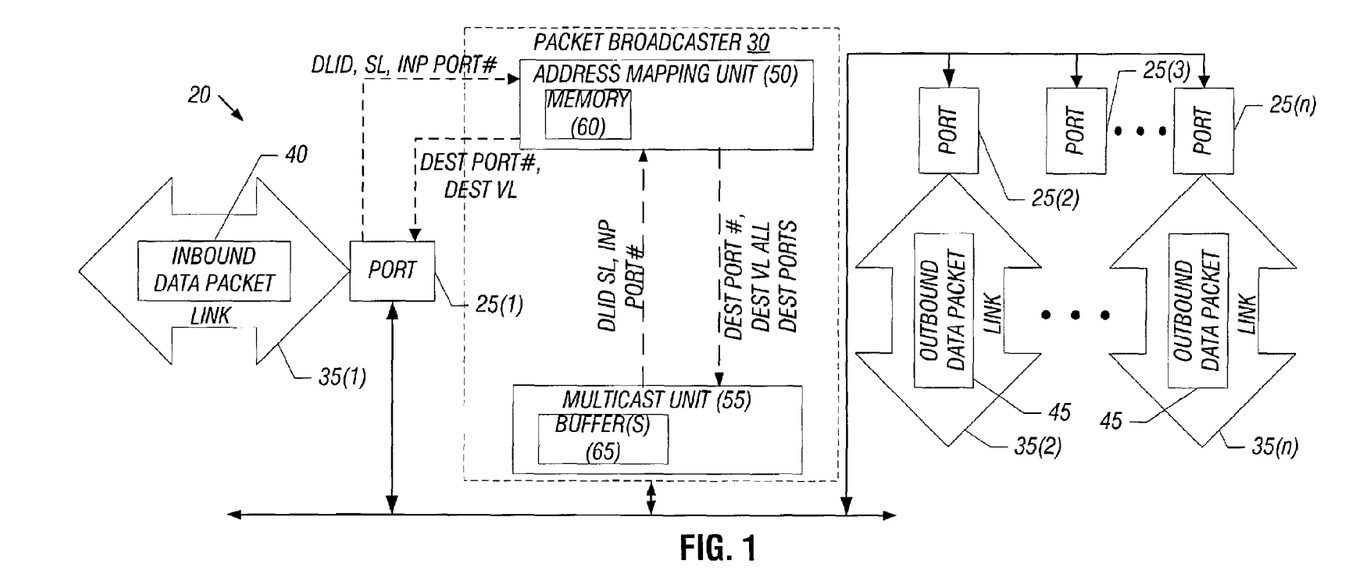
FIG. 1 is a schematic depiction of an interconnect device that routes packets of data in packet-based input/output communications according to one embodiment of the present invention.

An interconnect device 20 shown in FIG. 1 includes one or more of input ports 25(1) through 25(N), each operatively coupled to a packet broadcaster 30 for sending and/or receiving input/output (I/O) data, according to some embodiments of the present invention. An input port 25 is capable of connecting to a link 35 in order to receive or transmit different forms of data including a data packet, in one embodiment. Specifically, the input port 25(1) may connect to a link 35(1), in one exemplary operation, receiving an inbound data packet 40. Likewise, the input port 25(2) may be coupled to another link 35(2), transferring an outbound data packet 45 corresponding to the inbound data packet 40 over to a destination port (not shown), in some embodiments of the present invention. Examples of the interconnect device 20 include a switch, a router, and any of interconnect elements which are typically used for routing packets of data in a packet-based input/output (I/O) communication over an interconnect medium or infrastructure.

In one particular example, the interconnect medium includes a fabric, which may connect via one or more switches and routers, multiple destination ports that may be located in a variety of end node devices, such as input/output (I/O) devices. In many other examples, the interconnect medium may handle input/output data communications and inter-processor communications in a multi-computer environment which may include data servers networked over Internet, forming a network.

Examples of the end node devices include a single chip or processor-based devices or Internet adapters and host computers, such as data servers used in application processing and enterprise computing networks connected through a system area network (SAN). One example of a fabric is a switched input/output fabric that is capable of connecting multiple end node devices including processor nodes, redundant array of inexpensive disks (RAID) subsystems, I/O chassis, and storage subsystems. In some embodiments, the I/O chassis may further be connected to Internet, video devices, graphics, and/or a fiber channel hub.

Instead of sending the inbound data packet 40, if determined to be a multicast packet, to each destination port iteratively, the packet is simultaneously broadcast to all the destination ports in a specific example. Multicast refers to the case in which the inbound data packet 40 is to be transmitted to more than one destination port. A unicast packet may simply be forwarded to a predefined destination port, typically referred to a primary default multicast port. To appropriately route the inbound data packet 40 based on a packet attribute associated therewith, the packet broadcaster 30 may include an address mapping unit 50 and a multicast unit 55 in accordance with one embodiment of the present invention. The address mapping unit 50 may further comprise a memory 60, storing all combinations of a source port (e.g., the input port 25(1)) and one or more destination ports, and one or more destination paths associated with each of the destination ports. Likewise, the multicast unit 55 may include a set of buffers 65 to hold multicast packets in one illustrative example.

Using the memory 60, the destination ports and the destination paths may be looked up and all the destination ports for a packet transfer may be requested. In particular, a linear address mapping in the address mapping unit 50 may specify the destination ports to which the inbound data packet 40 may be routed or broadcast depending upon whether the inbound data packet 40 is a unicast or a multicast packet, respectively. For each destination port, a destination path (e.g., a virtual lane) may also be determined on which the inbound data packet 40 is to be transferred.

When identified to be a multicast packet from the memory 60, all combinations of a source port and one or more destination ports along with one or more destination paths associated with each of destination ports may be simultaneously determined for the inbound data packet 40. Thereafter, the inbound data packet 40 may be broadcast to at least one destination path associated with each of the destination ports indicated by a lookup of the memory 60, routing the multicast packet to a desired destination in some embodiments.

Upon receipt of a grant to transfer from one or more destination ports, the inbound data packet 40 may be transferred to all the associated destination ports on respective destination paths. If the inbound data packet 40 is determined to be a multicast packet, the set of buffers 65 may hold the packet while it is being transferred to the destination ports instead of holding the packet in the input port 25(1) queue as conventionally done, providing substantial speed up in handling of multicast packets in some embodiments. Moreover, being a multicast packet, the inbound data packet 40 may be broadcast simultaneously to all the desired destination ports over associated destination paths, obviating the need for one-to-one iterative transfer to each destination port.

For each inbound data packet 40, an associated packet attribute may be extracted from a local route header (LRH) in some embodiments. A destination local identifier (DLID) may be obtained from the packet attribute in order to route the packet from a source port to one or more destination ports. The inbound data packet 40 may also include a service level attribute, indicating a service level associated with the data packet, in some situations for instance. Based on the lookup, a mapping of a service level attribute onto one or more destination paths associated with each of the destination ports to which the inbound data packet 40 is to be sent may be performed at the interconnect device 20, in some particular examples consistent with the present invention.

The memory 60 may be configured such that the lookup is independent of a destination port. According to one particular embodiment, configuring the memory 60 entails providing an indication of all the destination paths of the destination ports, forming a combination of the source port and the service level attribute that the interconnect device 20 supports. By associating this combination with a virtual lane indication included in the memory 60 for at least two or each destination path associated with at least two or each destination port on the same link, depending upon an application, one or more differentiable service levels may be implemented in some cases. A service level associated with the inbound data packet 40 may be extracted from the service level attribute. In this way, based on all combinations of the source ports and the destination ports for the inbound data packet 40, mapping of the service level onto at least one destination path of at least two or each destination port over a next link (e.g., the link 35(2) being a continuation of the link 35(1)) may be accomplished, in some embodiments of the present invention.

Figure 2:
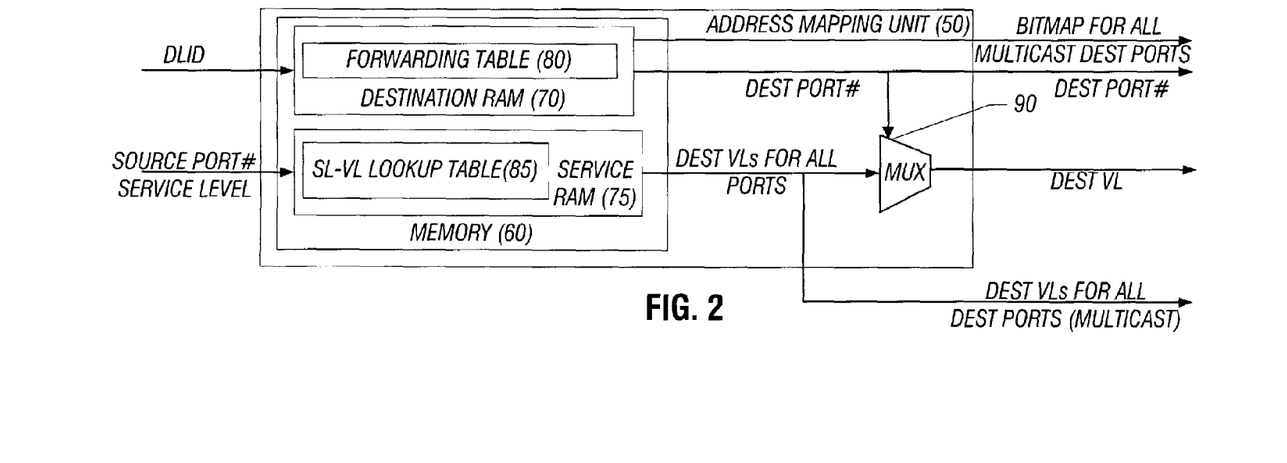
FIG. 2 is a schematic depiction of an address mapping unit capable of a parallel memory lookup for the interconnect device shown in FIG. 1 in accordance with one embodiment of the present invention.

Referring to FIG. 2, the address mapping unit 50 may further include within the memory 60 a destination random access memory (RAM) 70 and a service RAM 75. The destination RAM 70 may store a forwarding table 80 to identify a destination port number or a bitmap of destination ports (DEST PORT #) based on a destination local identifier. Similarly, the service RAM 75 may store a service level-virtual lane (SL-VL) lookup table 85. Consistent with one embodiment of the present invention, a single lookup of the memory 60 may involve a first mapping of the DLID that accesses the forwarding table 80, identifying the destination port number to which the inbound data packet 40 is to be routed. Within the same lookup, a second mapping of a source port and a service level (SL) to a destination virtual lane (DEST VL) may be provided in parallel to the first mapping, giving the destination path or virtual lane on which the inbound data packet 40 is routed for the destination port.

Using a source port number (SOURCE PORT #) and the service level designated to the inbound data packet 40, all the destination paths or virtual lanes (VLs) required to route the inbound data packet 40 to any destination port may be obtained. Because both the SL-VL mapping and the DLID-destination port mapping are done independently of the destination port, a single lookup of the memory 60 may provide a specific destination path for a unicast packet or the destination paths for all the destination ports for a multicast packet. The destination port number and the destination paths or virtual lanes for all destination ports may be combinatorially processed by a multiplexer (MUX) 90, selecting one of all the destination paths or virtual lanes available as a result of the SL-VL mapping in the single lookup for the unicast packet or all the destination paths or virtual lanes corresponding to all the destination ports for the multicast packet.

More specifically, by looking up the memory 60, in accordance with many examples, both DLID-destination port mapping returning the bitmap of all the destination ports in parallel to the SL-VL mapping resulting in all the destination paths or virtual lanes for each destination port to which the inbound data packet 40 is to be sent, may be obtained within a single lookup time. For multicast packets in which the packet is to be broadcast to multiple destination ports, a significant speed up is possible in one scenario. As an example, for a multicast packet that is to be broadcast to all the destination ports in a 32-port switch, a single lookup implementation may result in a 32 X speed up in the address mapping unit 50, substantially reducing the memory 60 lookup latency. Essentially, the latency may be reduced from up to 32 serial lookups of the memory 60 to a single lookup latency, because both mappings are done in parallel in some situations.

Figure 3:
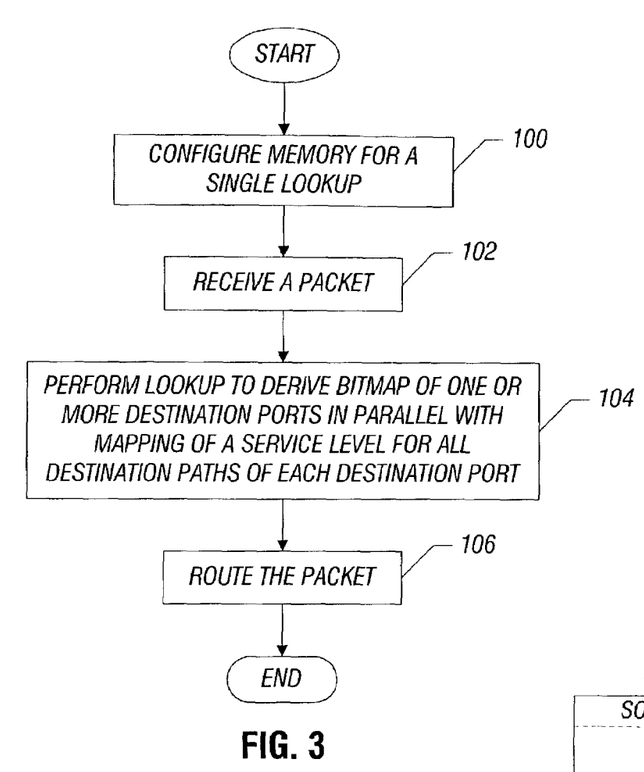
FIG. 3 is a flow chart consistent with one embodiment of the present invention.

A lookup process is illustrated in FIG. 3 for the memory 60 in the interconnect device 20 shown in FIG. 1, in accordance with some embodiments of the present invention. At step 100, the memory 60 may be configured to enable a single lookup capable of providing in parallel a first and a second mapping independent of a destination port, for instance. Upon receipt of a packet, e.g., the inbound data packet 40, using the packet attribute including DLID, SL, input or source port numbers, a lookup may be carried out at the address mapping unit 50. At step 104, the lookup of the memory 60 may be performed to derive a bitmap of one or more destination ports in parallel with mapping of the service level for all destination paths or virtual lanes for each destination port. While the destination path or virtual lane for a unicast packet may be used to route the packet, the destination paths or virtual lanes for all destination ports may be used to broadcast the multicast packet, according to one embodiment of the present invention, at block 106.

Figure 4:
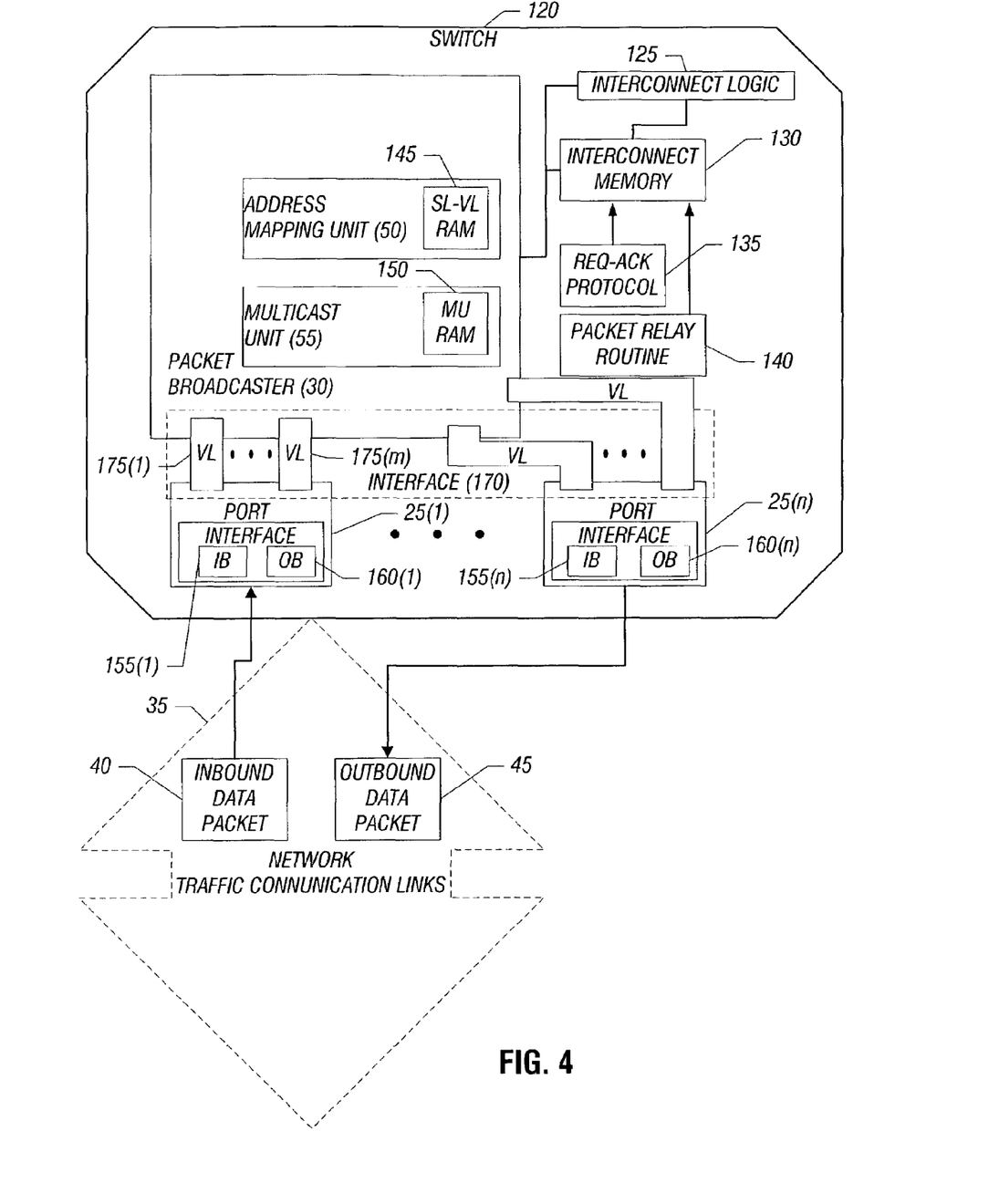
FIG. 4 is a schematic depiction of a switch based on the interconnect device shown in FIG. 1, according one embodiment of the present invention.

A switch 120 shown in FIG. 4 includes the packet broadcaster 30 shown in FIG. 1 to either route the inbound data packet 40 or broadcast the inbound data packet 40, depending upon the packet type, according to some embodiments of the present invention. The inbound data packet 40 may be communicated over the links 35 from the switch 120 as the outbound data packet 45 along with other network traffic, using appropriate network communications protocols, in some embodiments of the present invention.

Besides the packet broadcaster 30, the switch 120 may further include an interconnect logic 125 capable of controlling the switch 120 and providing one or more configuration options to suitably reconfigure the switch 120, depending upon a particular application or environment in which it may be deployed. In addition to the interconnect logic 125, the switch 120 may comprise an interconnect memory 130, storing a request-acknowledge (REQ-ACK) protocol 135 and a packet relay routine 140. The packet broadcaster 30 may include the address mapping unit 50 and multicast unit 55. As an example of some embodiments, the address mapping unit 50 may further include a service level-virtual lane (SL-VL) random access memory 145, while the multicast unit 55 may include a multicast unit (MU) random access memory 150, in one embodiment.

Using the REQ-ACK protocol 135, the packet relay routine 140 may control relaying of packets from the packet broadcaster 130. For a requester, the REQ-ACK protocol 135 between the multicast unit 55 and one or more destination ports may employ a set of control signals to route a unicast data packet from one input port 25(1) to another input port 25(N) to a specific destination port. Likewise, a multicast packet may be broadcast to all the desired destination ports. In particular, any destination port to which the multicast packet sent, to upon receipt thereof an associated acknowledge signal to the requester may be dropped, while the broadcasting of the multicast packet is continued until all the destination ports drop respective acknowledge signals, in one embodiment. By this approach, the multicast packet may use relatively fewer iterations rather than the one-to-one transfer case, substantially increasing the throughput for the multicast packet transfer.

Each port 25 may include an input buffer (IB) 155 to receive the inbound data packet and an output buffer (OB) 160 to hold the outbound data packet 45, in some embodiments of the present invention. Additionally, each port 25 may interface with the packet broadcaster 30 using a virtual interface 170. For each port 25, the virtual interface 170 may include a plurality of destination paths or virtual lanes (VLs) 175(1) through 175(M). Each virtual lane 175 may provide an independent data stream on a same link 35 in many different instances consistent with the present invention.

Figure 5:
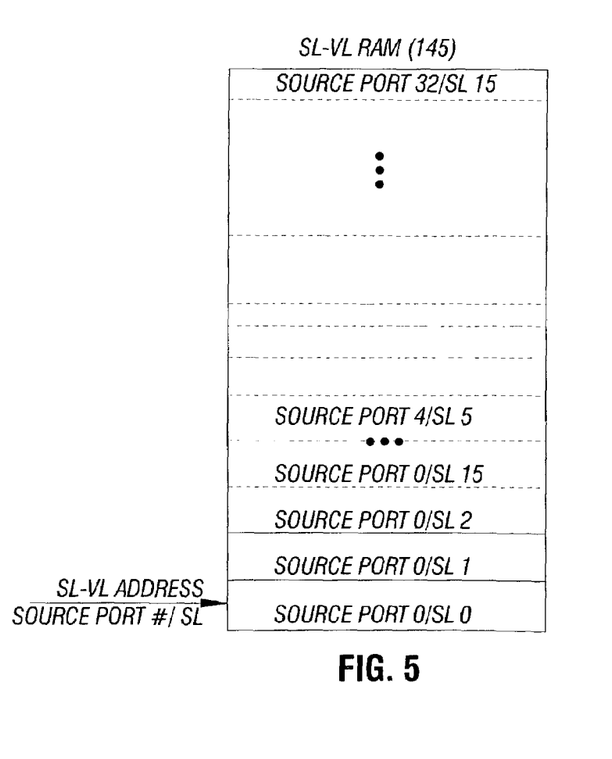
FIG. 5 shows a memory map of a random access memory that enables a service level-tovirtual lane destination path mapping in the switch shown in FIG. 4, according to one embodiment of the present invention.

A memory map is shown in FIG. 5 for the service level-virtual lane (SL-VL) random access memory 145 that provides address translation in response to lookup requests corresponding to inbound packets, according to in some embodiments of the present invention. While transferring a packet, regardless of the packet type, at least two or all input ports 25(1) through 25(N) on the switch 120 may perform mapping to route or broadcast the packet, such as the inbound data packet 40. By configuring the SL-VL RAM 145 to include at least two or all destination paths or virtual lanes (VLs) for each source port 25 and service level (SL) combination that the switch 120 supports, a single lookup independent of the destination port may provide all the destination paths or virtual lanes required to either route or broadcast a packet to any destination port, in some embodiments of the present invention. As an example, the SL-VL RAM 145 may support thirty-two ports, handling thirty-two potential address translation requests each encompassing the DLID-destination port translation and the SL-VL mapping done in parallel.

Figure 6:
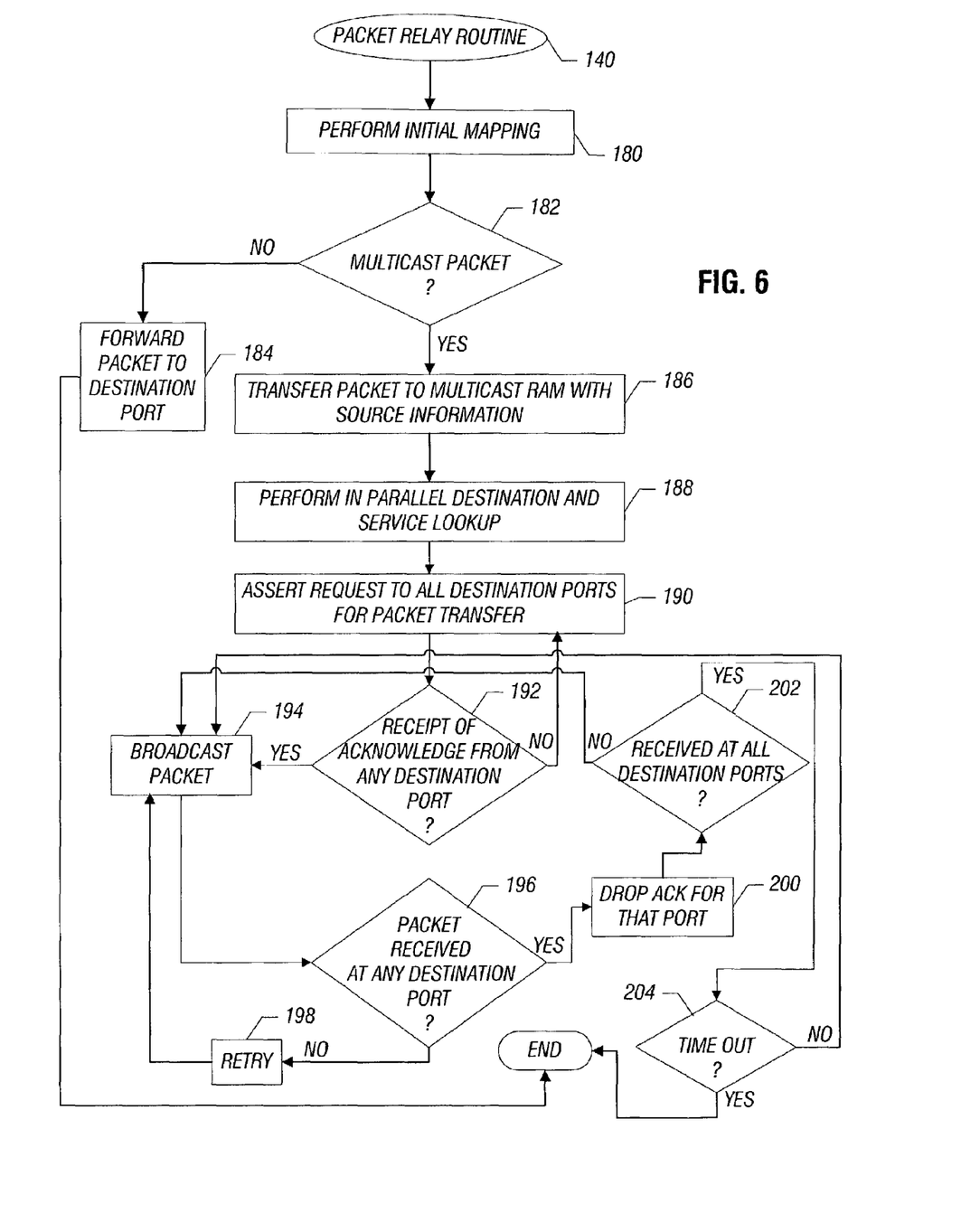
FIG. 6 is a flow chart for a packet relay routine for use with the switch shown in FIG. 4 in accordance with one embodiment of the present invention.

Referring to FIG. 6, the packet relay routine 140 may handle multicast packets in the switch 120 (FIG. 4) by simultaneously addressing the SL-VL RAM 145 in a single lookup, according to some embodiments of the present invention. The packet relay routine 140 and the address mapping unit 50 may cooperatively route a unicast packet to a particular destination port or broadcast a multicast packet to all destination ports. However, the packet relay routine 140 and the address mapping unit 50 may be deployed in other interconnect devices, including host channel adapters and target channel adapters, as one particular example.

At block 180, an initial mapping may be performed between a destination local identifier (DLID) to a specific destination port or ports. A check at diamond 182 may determine whether the inbound data packet 40 is a multicast packet. If the inbound data packet 40 is determined to be a unicast packet, the packet relay routine 140 may forward the packet to the specific destination port for appropriate routing at block 184. Conversely, at block 186, the multicast packet may be transferred to the multicast RAM 150 in the packet broadcaster 30 of the switch 120, as an example. Any source information, such as the source port number may also be transferred to the multicast RAM 150 for further processing by the multicast unit 55.

A lookup of the SL-VL RAM 145 may be performed for the service level (SL) and all the destination ports in parallel at block 188. At block 190, for the purposes of transferring the multicast packet, a request may be asserted to each of the destination ports. A check at diamond 192 may ascertain whether a receipt of acknowledge is received from any of the destination ports. If no receipt of acknowledge is received, the request to all the destination ports may be asserted again. Otherwise, the multicast packet may be broadcast to all the destination ports at block 194. Another check at diamond 196 may determine whether or not the multicast packet is received at any of the destination ports.

A retry attempt may be carried out at block 198, in case the multicast packet was not received at any of the destination ports. That is, the multicast packet may be broadcast again to all the destination ports. However, if the multicast packet is indicated to be received at any one of the destination ports, an acknowledge signal may be dropped corresponding to that port at block 200, indicating that the multicast packet was indeed received in a desired manner. Another check at diamond 202 may determine if the multicast packet is received by all the destination ports to which it is intended for, in one case without departing from the scope of the present invention. In case the multicast packet is not received at all the destination ports to which it is broadcast, the multicast packet may be broadcast again to all the destination ports. Alternatively, after a predetermined time out is reached for the multicast packet, the broadcasting is terminated and flow ends. When the multicast packet is determined to have not reached all the destination ports where it is indicated to be routed and yet the time out has not occurred then, broadcasting of the multicast packet may be performed again, in some embodiments.

Figure 7:
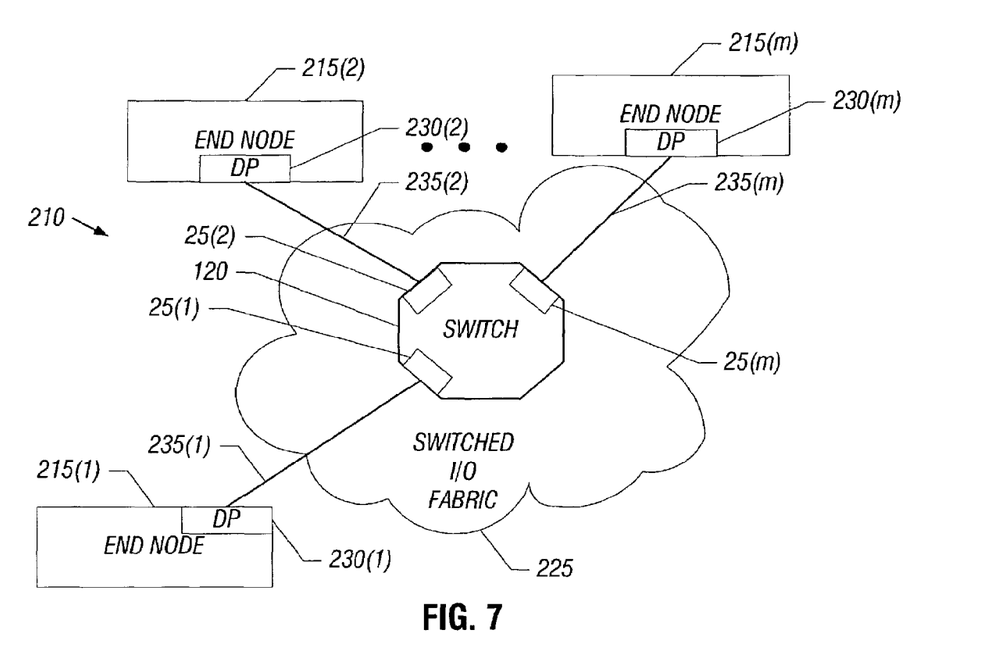
FIG. 7 depicts a system area network connecting end node devices via the switch shown in FIG. 4 over an input/output fabric according to one embodiment of the present invention.

A system area network (SAN) 310 as shown in FIG. 7 may be deployed to connect one or more end node devices 215(1) through 215(N), which may communicate by exchanging unicast and/or multicast packets of data according to some embodiments of the present invention. The switch 120 may interconnect the end node devices 215(1) through 215(N) over a switched input/output (I/O) fabric 225, providing packet-based data communications in addition to interprocess communications, in one exemplary embodiment. Of course, additional switches and other interconnect devices, such as routers, host channel adapters, and target channel adapters, may be deployed for the switched I/O fabric 225 in other embodiments. Each end node device 215 may include a destination port (DP) 230. Each destination port 230 may connect to a respective link 235 on one end and on the other end to the input port 25 associated with the switch 120, establishing a packet-based data input/output communication link.

The switch 120 may use the packet relay routine 140 (FIG. 4) and the requestacknowledge protocol 135 to enable communications over the switched I/O fabric 225. In addition, the multicast unit 55 may establish a pair of signals between the multicast unit 55 and one or more of destination ports 230(1) through 230(N), based on the REQ-ACK protocol 135.

Figure 8A:
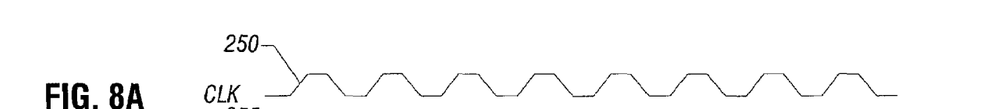
FIGS. 8A-8E show illustrative timing charts for a request-acknowledge protocol controlling flow of data between a multicast unit and one or more destination ports of the switch shown in FIG. 4 consistent with one embodiment of the present invention.
Figures 8B, 8C, 8D, 8E:
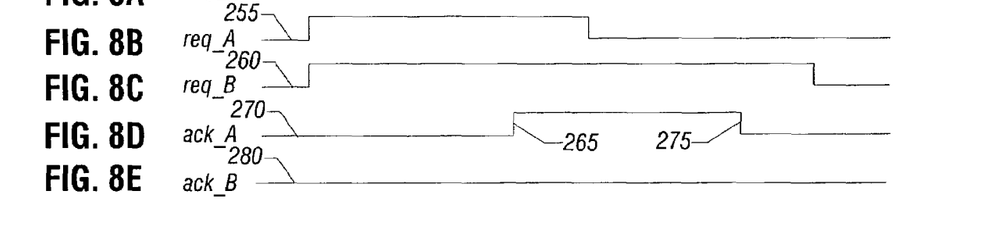

Illustrative timing charts for the REQ-ACK protocol 135 are shown in FIGS. 8A-8E, according to some embodiments of the present invention. In particular, FIG. 8A depicts a clock signal (CLK) for use with the multicast unit 55 and the destination ports 230. For transferring a packet to a destination port, in this example, two request signals REQ_A 255, REQ_B 260 are shown in FIGS. 8B and 8C, respectively. To handle a multicast packet, both the request signals 255, 260 may be asserted to the respective destination ports 230(1), 230(2).

Although not so limited, in some examples of the present invention, using a request-acknowledge hand-shake mechanism, upon receipt of a low-high transition 265 on an acknowledge signal ACK_A 270 from any of the two destination ports 230(1), 230(2), the multicast packet may be broadcast to both the destination ports. If any one of the destination ports 230(1), 230(2) receives the multicast packet in a desired manner, the corresponding acknowledge signal 270 may be dropped, i.e., transitioned to a high-low transition 275.

Another acknowledge signal ACK_B 280 as shown in FIG. 8E may be maintained at a low-level, indicating that a destination port 230 is ready to accept the multicast packet. However, when a destination port 230 maintains the acknowledge signal at a high-level, a retry may be desired, indicating that the destination port is ready to accept the multicast packet because a complete packet was not received. Therefore, in one embodiment, as long as there is at least one pair of a request and an acknowledge signal that is maintained at a high-level, the multicast packet is broadcast to all the destination ports until all the destination ports 230 provide a respective acknowledge signal having a high-low transition, or alternatively, a multicast time out occurs. In such a case, all the original requests, i.e., request signal 255, 260 may be dropped by the multicast unit 55. In response, all the destination ports, i.e., 230(1), 230(2) may drop any pending acknowledge signals, in some embodiments.

Consistent with some embodiments, Infiniband architecture (IBA) specification which describes a mechanism for interconnecting processor nodes and (I/O) nodes to form a system area network may be deployed to form the SAN 210. The Infiniband architecture specification is set forth by the Infiniband Trade Association in a specification entitled, "Infiniband Architecture, Vol. 1: General Specifications," Release 1.0, published in June 2001. Using this architecture, the SAN 210 may be independent of the host operating system (OS) and processor platform. Because the IBA architecture is designed around a point-to-point architecture, a switched I/O fabric may interconnect end node devices 215 that may be connected by switches 120. The end node devices 215 may range from relatively inexpensive I/O devices like a single chip or Internet adapters to very complex host computers. The IBA-based switched I/O fabric may provide a transport mechanism for messages and queues for delivery between end node devices 215. The interconnect infrastructure called switched I/O fabric may be based on the way input and output connections may be constructed between multiple host and targets in many examples. Using the channel-based I/O model of mainframe computers, channels may be created by attaching host channel adapters and target channel adapters through switches 120. The host channel adapters may serve as I/O engines located within a server. The target channel adapters may enable remote storage and network connectivity into the switched I/O fabric.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining, in a lookup from a memory, at least two combinations of a source port and one or more destination ports, and one or more destination paths associated with each of said one or more destination ports for an inbound packet based on a packet attribute associated therewith;
    asserting a request to all destination ports of said one or more destination ports for a packet transfer;
    detecting a receipt of acknowledge for the request from any destination port of said one or more destination ports;
    in response to the receipt of acknowledge, simultaneously broadcasting the multicast packet to each said destination port until receiving each receipt of acknowledge therefrom; and
    dropping the receipt of acknowledge upon a receipt of the inbound packet at each said destination port or at reaching a predetermined time out.

2. The method of claim 1 further comprising:
    receiving the inbound packet at a switch in a packet-based data communication; and
    performing at the switch said lookup of the memory to route the inbound packet.

3. The method of claim 2 further comprising:
    configuring the memory such that said lockup is independent of each of said one or more destination ports.

4. The method of claim 1 further comprising:
    providing in the memory one or more differentiable service levels for said combination of the source port and the service level attribute; and
    extracting a service level from the service level attribute of the inbound packet.

5. The method of claim 4 further comprising mapping the service level onto at least one destination path of each said destination port over a next link on the same link based on said all combinations of said source port and said one or more destination ports.

6. The method of claim 1 further comprising:
receiving the inbound packet;
extracting source information from the packet attribute of the inbound packet; and
determining whether or not the inbound packet is a unicast or a multicast packet based on the packet attribute.

7. The method of claim 6, further comprising:
in response to the multicast packet, transferring the inbound packet with the source information packet to a random access memory; and
performing in parallel destination and service lookups from the random access memory.

8. A device comprising:
a memory storing a protocol to perform a request-acknowledge signaling to and from said one or more destination ports;
a routine to relay the inbound packet based on the packet attribute based on the request-acknowledge signaling;
a port to receive an inbound packet including a packet attribute associated therewith; and
a packet broadcaster coupled to said port to determine in a lookup for the inbound packet at least two combinations of a source port and one or more destination ports, and one or more destination paths associated with each of said one or more destination ports based on the packet attribute and broadcast the inbound packet onto one or more destination paths associated with each of said one or more destination ports.

9. The device of claim 8, said port to receive said inbound packet in a packet-based data communication over an input/output link.

10. The device of claim 9 is a switch that routes the inbound packet from a different port than said part over another input/output link based on the packet attribute.

11. The device of claim 10, said packet broadcaster further comprising a first device including a random access memory of which said lookup to provide a destination address mapping in parallel to a service level mapping.

12. The device of claim 8, wherein said random access memory to enable said lookup independent of each destination port of said one or more destination ports.

13. The device of claim 8, said routine to determine whether or not the inbound packet is a unicast or a multicast packet based on the packet attribute.

14. The device of claim 13, said packet broadcaster further comprising a second device that enables a transfer of the multicast packet to all destination ports of said one or more destination ports.

15. The device of claim 13, said random access memory to configurably store an indication of all the destination paths of said one or more destination paths for a combination of the source port and a service level attribute that the switch supports.

16. The device of claim 13, wherein said switch to communicatively connect one or more nodes over an input/output fabric.

17. An article comprising a medium storing instructions that, when executed by a processor-based system result in:
determining in a lookup from a memory at least two combinations of a source port and one or more destination ports, and one or more destination paths associated with each of said one or more destination ports for an inbound packet based on a packet attribute associated therewith;
broadcasting the inbound packet onto said one or more destination paths associated with each of said one or more destination ports;
detecting a receipt of acknowledge for the request from any destination port of said one or more destination ports;
in response to the receipt of acknowledge, simultaneously broadcasting the multicast packet to each said destination port until receiving each receipt of acknowledge therefrom; and
dropping the receipt of acknowledge upon a receipt of the inbound packet at each said destination port or at reaching a predetermined time out.

18. The article of claim 17 comprising a medium storing instructions that, when executed by a processor-based system result in:
receiving the inbound packet at a switch in a packet-based data communication; and
performing at the switch said lookup of the memory to route the inbound packet.

19. The article of claim 18, comprising a medium storing instructions that, when executed by a processor-based system result in:
configuring the memory such that said lookup is independent of each of said one or more destination ports; and
mapping a service level attribute onto said one or more destination paths associated with each destination port to which the inbound packet is to be sent based on said lookup.

20. The article of claim 19, comprising a medium storing instructions that, when executed by a processor-based system result in configuring the memory further comprising providing an indication of all the destination paths of said one or more destination ports for a combination of the source port and the service level attribute that the switch supports.

21. The article of claim 20, comprising a medium storing instructions that, when executed by a processor-based system result in:
forming said combination of the source port and the service level attribute for the switch;
including in the memory a virtual lane indication for each said destination path associated with each said destination port on a same link; and
associating said combination with said virtual lane indication.

22. The article of claim 21, comprising a medium storing instructions that, when executed by a processor-based system result in:
providing in the memory one or more differentiable service levels for said combination of the source port and the service level attribute; and
extracting a service level from the service level attribute of the inbound packet.

23. The article of claim 22, comprising a medium storing instructions that, when executed by a processor-based system result in mapping the service level onto at least one destination path of each said destination port over a next link on the same link based on said all combinations of said source port and said one or more destination ports.

24. The article of claim 17, comprising a medium storing instructions that, when executed by a processor-based system result in:
extracting source information from the packet attribute of the inbound packet; and determining whether or not the inbound packet is a unicast or a multicast packet based on the packet attribute.

25. The article of claim 24, comprising a medium storing instructions that, when executed by a processor-based system result in:
    in response to the multicast packet, transferring the inbound with the source information packet to a random access memory;
    performing in parallel destination and service lookups from the random access memory; and
    asserting a request to all destination ports of said one or more destination ports for a packet transfer.

26. The method of claim 3, wherein configuring the memory further comprising providing an indication of all the destination paths of said one or more destination ports for a combination of the source port and a service level attribute that the switch supports.

27. The method of claim 26 further comprising:
    forming said combination of the source port and the service level attribute for the switch;
    including in the memory a virtual lane indication for each said destination path associated with each said destination port on a same link; and
    associating said combination with said virtual lane indication.

28. The method of claim 27 further comprising:
    providing in the memory one or more differentiable service levels for said combination of the source port and the service level attribute; and
    extracting a service level from the service level attribute of the inbound packet.

* * * * *

UNITED STATES PATENT AND TRADEMARK OFFICE
CERTIFICATE OF CORRECTION

PATENT NO.         : 7,346,064 B2                                                          Page 1 of 1
APPLICATION NO. : 10/255419
DATED              : March 18, 2008
INVENTOR(S)        : Percy K. Wadia et al.

It is certified that error appears in the above-identified patent and that said Letters Patent is hereby corrected as shown below:

Column 8:
Line 60, "lockup" should be --lookup--.

Column 9:
Line 39, "part" should read --port--.

Signed and Sealed this

Eighth Day of July, 2008

JON W. DUDAS
*Director of the United States Patent and Trademark Office*